(12) United States Patent
Møller

(10) Patent No.: US 11,597,043 B2
(45) Date of Patent: Mar. 7, 2023

(54) BOLT TENSIONING ASSEMBLY AND METHOD FOR TENSIONING OF A BOLT

(71) Applicant: Designbanken AS, Stavanger (NO)

(72) Inventor: Espen Møller, Hafrsfjord (NO)

(73) Assignee: Designbanken AS, Stavanger (NO)

( * ) Notice: Subject to any disclaimer, the term of this patent is extended or adjusted under 35 U.S.C. 154(b) by 989 days.

(21) Appl. No.: 16/329,525

(22) PCT Filed: Sep. 1, 2017

(86) PCT No.: PCT/NO2017/050216
§ 371 (c)(1),
(2) Date: Feb. 28, 2019

(87) PCT Pub. No.: WO2018/044178
PCT Pub. Date: Mar. 8, 2018

(65) Prior Publication Data
US 2019/0193216 A1    Jun. 27, 2019

(30) Foreign Application Priority Data
Sep. 5, 2016  (NO) .................................... 20161399

(51) Int. Cl.
*F16B 31/04*     (2006.01)
*B23P 19/06*     (2006.01)
(Continued)

(52) U.S. Cl.
CPC ........ *B23P 19/067* (2013.01); *F16B 23/0069* (2013.01); *F16B 31/043* (2013.01);
(Continued)

(58) Field of Classification Search
CPC ............................... F16B 31/043; B25B 29/02
(Continued)

(56) References Cited

U.S. PATENT DOCUMENTS 2,571,265 A * 10/1951 Leufven ................ F01D 25/243
411/917
3,463,044 A *  8/1969 Hudgins ................. F16B 4/002
411/391
(Continued)

FOREIGN PATENT DOCUMENTS

CN        201755752       3/2011
FR           931014       2/1948
(Continued)

OTHER PUBLICATIONS

Extended European Search Report for EP 3507059, dated Mar. 4, 2020.
(Continued)

*Primary Examiner* — Flemming Saether
(74) *Attorney, Agent, or Firm* — Andrus Intellectual Property Law, LLP

(57) ABSTRACT

A bolt tensioning assembly has a bolt with a first end portion and a second end portion at an opposite side of the bolt. The first end portion has an enlarged diameter to form a counter-pressure surface facing the second end portion. The first end portion has external threads to receive a lock nut. A hydraulic bolt tensioning device is for tensioning of the bolt. The hydraulic bolt tensioning device is arranged for enclosing a portion of the bolt such that it abuts the counter pressure surface. A lock nut is arranged on the first end portion of the bolt. The hydraulic bolt tensioning device and lock nut are dimensioned such that upon tightening of the lock nut, the lock nut will tighten against a portion of the hydraulic bolt tensioning device.

4 Claims, 3 Drawing Sheets

(51) Int. Cl.
*F16B 39/12* (2006.01)
*F16B 23/00* (2006.01)
*F16L 1/26* (2006.01)
*F16L 23/00* (2006.01)

(52) U.S. Cl.
CPC .............. *F16B 39/12* (2013.01); *F16L 1/26* (2013.01); *F16L 23/003* (2013.01)

(58) Field of Classification Search
USPC .................................................. 411/14.5, 916
See application file for complete search history.

(56) References Cited

U.S. PATENT DOCUMENTS

| | | | |
|---|---|---|---|
| 3,841,193 A | 10/1974 | Ito | |
| 4,085,649 A * | 4/1978 | Christensson | F16B 31/043 411/548 |
| 4,569,506 A | 2/1986 | Vassalotti | |
| 4,681,493 A * | 7/1987 | Vollmer | F16B 31/043 411/8 |
| 5,046,906 A * | 9/1991 | Bucknell | F16C 35/063 411/917 |
| 5,339,512 A * | 8/1994 | Odsberg | B23P 19/067 29/452 |
| 5,468,106 A * | 11/1995 | Percival-Smith | F16B 31/043 411/917 |
| 6,840,726 B2 | 1/2005 | Gosling | |
| 7,195,439 B2 * | 3/2007 | Kamppila | F16B 31/043 411/917 |
| 7,673,849 B2 * | 3/2010 | Britton | F16B 31/04 254/29 A |
| 2004/0115023 A1 | 6/2004 | Gosling | |
| 2007/0166121 A1 | 7/2007 | Mynhier et al. | |
| 2015/0030385 A1 | 1/2015 | Bucknell | |
| 2016/0069373 A1 | 3/2016 | Trautman | |

FOREIGN PATENT DOCUMENTS

| | | |
|---|---|---|
| GB | 1204925 | 9/1970 |
| JP | H04185971 A | 7/1992 |
| SE | 360295 | 9/1973 |

OTHER PUBLICATIONS

Superbolt Multi-jackbolt tensioners (MJT) standard range, Copyright 2015 Nord-Lock Group, www.nord-lock.com.
Superbolt multi-jack tensioners from the Nord-Lock Group, Bolting Made Simple, http://www.nord-lock.com/superbolt/multi-jackbolt-tensioners, website visited Nov. 17, 2017.
Norwegian Search Report, Norwegian Patent Application No. 20161399, dated Mar. 31, 2017.
International Search Report, PCT/NO2017/050216, dated Nov. 28, 2017.
Written Opinion, PCT/NO2017/050216, dated Nov. 28, 2017.
International Preliminary Report on Patentability, PCT/NO2017/050216, dated Sep. 20, 2018.
Search Report issued in Chinese Patent Application No. 2017800542897, dated May 12, 2020.

* cited by examiner

BOLT TENSIONING ASSEMBLY AND METHOD FOR TENSIONING OF A BOLT

FIELD

The invention concerns a bolt tensioning assembly for tensioning of a bolt which may be used for securing a connection, for instance a flange connection, wherein the bolt tensioning assembly comprises a bolt and a bolt tensioning device. Furthermore, the invention concerns a method of tensioning said bolt to provide it with the optimal tension for securing of said connection.

It must be noted that the term "bolt" herein is used as a general term comprising any bolt, rod, stud or other elongated fastening member suitable for securing a mechanical connection between structural members such as a pair of opposing flanges on a piece of machinery.

BACKGROUND

Mechanical connections, where two or more components are connected by means of at least one bolt, are often critical for the installation which they are part of, and thus proper securing of the connection is of great importance. Such critical mechanical connections may for instance be pipeline flanges and other subsea installations, but may also be connected to for instance pipeline connections, pressure vessels, windmills and a long list of other installations. Common for all of them is that the connection needs to be secure, and that the bolts used preferably may be tightened in a predictable manner, such that the tension in the bolt after tightening is at a desirable level.

In order to obtain this, it is known to provide a hydraulic bolt tensioning device for tensioning of the bolts. The bolt is then first placed in the connection which it is to secure, and fastened at one side of the connection with for instance a nut. When the bolt is placed like this, it extends out from the other side of the connection. A lock nut is then provided on this other side, and tightened against the surface of the connection. Thereafter the tensioning device is arranged enclosing the lock nut and the part of the bolt which extends outside of the lock nut. The tensioning device is secured to the bolt and then tension is provided such as to tension the bolt to a predetermined level of tension. The tension is kept by the tensioning device until the lock nut has been tightened again in order to lock the tension in the bolt connection. In order to provide necessary access to the lock bolt to perform this tightening up of the lock nut, the prior art tensioning devices are provided with a window or hole, or a so-called bridge. In subsea installations this last tightening of the bolts is typically done by a diver provided with a suitable tool, or by a remotely operated or ROV-assisted special tool.

Patent publication GB 2492140 A discloses a bolt tensioner, especially a hydraulic bolt tensioner of the kind described above, for threaded connection to a bolt to be tensioned, and for removal from the bolt after tightening of a lock nut.

Patent publication US 2016069373 A1 discloses a hydraulic rod tensioning system wherein the tensioning system is arranged with a reaction foot around both the bolt and the lock nut.

One of the drawbacks of the prior art solutions is that the lock nut which needs to be tightened up after tensioning of the bolt, is difficult to access because it is partly enclosed by the bolt tensioning device. The problem is that the bridge or housing of the bolt tensioning device needs to have the capacity to withstand the same load as the tensioned bolt, and therefore only limited access in the form of windows/holes may be permitted. Often the tools necessary for rotation of the lock nut while the tensioning device is still in place, are left behind. In diver assisted operations subsea, the rotation of the luck nut is also time consuming for the diver. In particular it is difficult to use an ROV assisted tool to rotate the lock nut while the tensioning device is still in place.

Patent publication US 2007/0166121 A1 discloses a self-locking tensioner where the above-mentioned problem is circumvented by not using a lock nut at all. Instead, the self-locking tensioner which can be used for placing a piston or stud in tension, comprises slip wedges positioned between the piston/stud and a body which houses the piston and the slip wedges. Said body has a central channel with a conical portion. The stud/piston is in principle being tensioned and locked at the same time, because the activation of the hydraulic system forces the wedges further into the conical portion of the central channel such that they are locked between the body and the stud/piston. One disadvantage of this self-locking tensioner is that by using wedges there will be considerable friction between the wedges such that the tensioning of the bolt is less efficient than what is the case in prior art solutions using a lock nut, i.e. there is no direct relationship between the applied hydraulic force and the resulting tensioning of the stud/piston. Another disadvantage is that it is known in the art that conical locking systems have large and partly unverifiable lock loss.

SUMMARY

The invention has for its object to remedy or to reduce at least one of the drawbacks of the prior art, or at least to provide a useful alternative to prior art.

The object is achieved through features, which are specified in the description below and in the claims that follow.

The invention is defined by the independent patent claims. The dependent claims define advantageous embodiments of the invention.

In a first aspect the invention relates to a bolt tensioning assembly comprising:
  a bolt comprising a first end portion and a second end portion at an opposite side of the bolt,
wherein the first end portion is provided with an enlarged diameter to form a counter-pressure surface facing the second end portion; and wherein the first end portion is further provided with external threads to receive a lock nut;
  a hydraulic bolt tensioning device for tensioning of the bolt, the hydraulic bolt tensioning device being arranged for enclosing a portion of the bolt such that it abuts the counter pressure surface; and
  a lock nut arranged on the first end portion of the bolt; wherein the hydraulic bolt tensioning device and the lock nut are dimensioned such that upon tightening of the lock nut, the lock nut will tighten against a portion of the hydraulic bolt tensioning device.

When the bolt with the bolt tensioning assembly is connected to two structural members, such as flange members, which are to be securely connected, the hydraulic bolt tensioning device functions as a thick disk relative to the lock nut and transmits the load from the tensioning of the bolt via the lock nut and to a contact surface of the hydraulic bolt tensioning device arranged for contact with structural members of the connection.

There are great advantages of providing a bolt tensioning assembly as mentioned above. Firstly, the assembly may be completely assembled at the first end portion of the bolt, before being installed in the installation where it is needed. This solves a problem of prior art which is especially important for subsea installations, namely that the prior art bolt tensioning devices require many components to be mounted on the bolt while the bolt is already in place, before the tensioning of the bolt may start. Secondly, by placing the lock nut outside of the hydraulic bolt tensioning device at the free end of the first end portion, the lock nut may much easier be accessed, tightened, and inspected, and also much easier be replaced in case irregularities are found.

Herein is also in further detail described the bolt for the bolt tensioning assembly, the bolt comprising a first end portion and a second end portion at an opposite side of the bolt, wherein:

the first end portion is provided with an enlarged diameter to form a counter-pressure surface facing the second end portion; and the first end portion is further provided with external threads to receive a lock nut.

A bolt is an example of an elongated connecting means having a bolt body with two end portions. The bolt according to the invention is a bolt suitable for being tensioned and for being used for instance for connecting two flanges, also subsea, and in any other installations where tensioning of bolts is necessary to obtain a secure connection.

The first end portion of the bolt according to the invention is provided with an enlarged diameter. This means that in the first end portion the bolt is provided with an expanded portion, such that the bolt is thicker in this area. By enlarging the diameter, the bolt is provided with a shoulder or step such as a surface facing the second end portion of the bolt is formed. This surface is named a counter-pressure surface as it is suitable for providing counter-pressure against any tensioning tool or tensioning device which may be provided to enclose the bolt in the portion adjacent to the first end portion. Tensioning of the bolt is carried out after securing the second end portion of the bolt to the two objects which the bolt is to connect, said objects may, as mentioned before, be two flanges of a flange connection. The tensioning device may then be arranged in the area between the first end portion of the bolt and the flanges to be connected.

The effect of providing a bolt portion of larger diameter than the bolt portion around which the bolt tensioner device is to be arranged, is that the bolt tensioner device may use the surface resulting from such an extension of diameter as a counter-pressure surface. The bolt tensioning device will thus, after tensioning of the bolt be completely locked in between the surface of the connection to be secured, and the first end portion of the bolt. This allows for the lock nut to be secured to the external threads of the first end portion and thereby lock the tension in the bolt. The bolt tensioning device will be left on the bolt. The lock nut will be easily accessible for tightening up after tensioning as it is placed outside of the tensioning device.

This solution also leads to the simpler manufacturing of bolt tensioning devices, which now have no need for bridges, pressure feet, or windows/slots.

With the bolt according to the invention a further drawback of prior art is also solved, namely the challenge of possible deflection of the bolt and lock nut in the area of tensioning. If there is deflection, the lock nut may not be satisfactorily secured to the bolt after tensioning, and the tightening up of the lock nut may not fully lock the tension within the bolt. The lock nut may also lock too early, before it has reached the correct position. When this happens the installation has to be aborted in order to repair the tools and equipment. This is obviously very expensive, especially when the installation is a subsea installation. By moving the lock nut to the first end portion of the bolt, which is not tensioned, but adjacent to the tensioned area, this challenge is completely removed.

One bolt disclosed herein may also be described as a bolt for connecting two structural members, the bolt comprising a first end portion, a second end portion and a middle portion between the two end portions: wherein the first end portion is provided with an enlarged diameter relative to a diameter of the middle portion to form a counter-pressure surface facing the second end portion, said first end portion is provided with external threads for receiving a lock nut;

the second end portion is adapted to extend through a suitable bolt hole in the structural members such that a free end of the second end portion extends out from the structural members for being securely fastened by means of a fastening means;

the middle portion is arranged for receiving a tensioning device for tensioning of the bolt, wherein said tensioning device is arranged to be provided between the counter-pressure surface of the first end portion and the structural members.

The bolt is in its middle portion arranged to receive a bolt tensioning device which at one side may bear against the connection to be secured, such as a flange connection, and at the other side may bear against the counter-pressure surface of the first end portion with enlarged diameter. The first end portion with enlarged diameter is herein defined as a portion on the bolt which has a larger diameter than the diameter of the adjacent middle bolt portion.

The enlarged diameter of the first end portion may be provided by means of a nut arranged on the bolt, said nut being provided with external threads for receiving the lock nut.

Enlarging the diameter by means of adding a separate nut has the effect of increased flexibility with regards to position and size of the area of enlarged diameter, because different sizes of nut may be used. This nut may be provided with a mechanism for locking it to the bolt, said locking mechanism may be threads. As mentioned, the nut is provided with external threads for receiving the lock nut. Depending on the locking mechanism for locking the nut to the bolt, the external of the nut may be only partly threaded.

The first end portion of the bolt, and thus the area of enlarged diameter, may be an integral part of the bolt.

This is an alternative way of providing the counter-pressure surface. One advantage of having the first end portion as an integral part of the bolt is that there are less possible weak points the fewer parts there are present in a connection where this kind of bolt is used.

Herein is also described a nut for enlarging the diameter of the bolt described herein, wherein said nut is provided with internal threads and with external threads for receiving a further nut.

The nut for enlarging the diameter of the bolt solves the problem of providing an enlarged diameter in the first end portion of the bolt according to the first aspect of the invention. Such a nut may be provided with different diameters such as to fit different corresponding pieces of equipment, i.e. lock nuts, bolts and available tensioning device for tensioning of the bolt.

The hydraulic bolt tensioning device may comprise a hydraulic cylinder comprising a cylinder house, a piston and a piston rod. In this embodiment, the cylinder house functions as a thick disk relative to the lock nut and transmits the load from the tensioning of the bolt via the lock nut and to the contact surface of the cylinder house with the structural members of the connection.

In a preferred embodiment of the invention, the piston rod may be a portion of the bolt which is to be tensioned. Providing the bolt to be tensioned as an integral part of the hydraulic cylinder simplifies the construction of the bolt tensioning assembly in that fewer parts are required.

In a second aspect the invention relates more particularly to a hydraulic bolt tensioning device in a bolt tensioning assembly according to the first aspect of the invention wherein the bolt tensioning device is arranged to be locked between the lock nut and a structural element which the second end portion of the bolt has been connected to. The bolt tensioning device is arranged to be provided between two counter pressure surfaces in order to apply tension to the bolt to be tensioned.

In the prior art the hydraulic bolt tensioning device itself comprises a counter pressure surface in for example the form of a nut which is installed on the bolt together with the rest of the hydraulic bolt tensioning device and removed again after tensioning of the bolt. Also, in the prior art it is described that the bolt to be tensioned is first arranged through the two structural members which it is to connect and secured by a nut on each side of the structural members, thereafter the bolt tensioning device is installed. The hydraulic bolt tensioning device according to the invention may be installed on the bolt after having the bolt secured at one side of the structural members. This is only valid in the case where the enlarged diameter of the first end portion of the bolt is provided by means of a nut according to the second aspect of the invention, such that the enlarged diameter may be arranged on the bolt after installation of the hydraulic bolt tensioning device. In cases where the enlarged diameter, and thus the counter-pressure surface of the first end portion of the bolt is integral with the bolt, the hydraulic bolt tensioning device is arranged on the bolt before connecting the bolt to the structural members which it is to connect. The hydraulic bolt tensioning device will then be arranged around the portion of the bolt which extends between a surface of one of the structural members of the connection and the counter-pressure surface of the bolt.

In a third aspect the invention relates more particularly to a method for tensioning of a bolt, the method comprising the steps of:
  providing a bolt tensioning assembly according to the first aspect of the invention;
  securely connecting the second end portion of the bolt to the structural elements to be connected;
  providing hydraulic pressure to the bolt tensioning device such that the bolt is tensioned;
  tightening the lock nut; and
  removing the hydraulic pressure.

In the step of securely connecting the second end portion of the bolt to the structural elements to be connected, it must be understood that the bolt is put through a hole which extends through the structural elements. The second end of the bolt may then be securely fastened, i.e. prevented from returning back, by means of a nut.

When the lock nut has been tightened, the hydraulic cylinder is left in place to keep the tension in the bolt also after removal of the hydraulic pressure.

Summarized, in a preferred embodiment of the invention, a system for tensioning of a bolt is provided, wherein the bolt is provided as an integral part of a hydraulic cylinder. The bolt is tensioned to a predetermined tensioning by means of hydraulic pressure. Furthermore, an external nut, in the above named a lock nut, is used for locking the desired tensioning within the bolt, such that the hydraulic pressure may be released after having gained the desired tensioning of the bolt. The bolt may thus maintain the tensioning without being exposed to hydraulic pressure. All parts of the bolt tensioning assembly may be left behind after installation.

In this assembly there is no need for providing a bridge for the free movement of, and access to, the lock nut as the lock nut is moved to a location outside of the hydraulic cylinder, namely to the first end portion of the bolt, said portion having an enlarged diameter compared to the bolt portion enclosed by the hydraulic cylinder.

The above-described bolt tensioning assembly may be remotely operated, or it may be operated by an ROV, or it may be operated manually. In subsea installations manual operation is performed by divers. Said bolt tensioning assembly may be used in connection with installation of pipe flanges, clamps, brackets and other installations which need fastening or securing by means of pretensioned bolts.

With the bolt tensioning assembly according to the invention, the equipment left behind at the location of installation is minimalised, i.e. only the cylinder housing and the parts required for transferring hydraulic pressure to the bolt is left behind.

The following items are also disclosed:
1) Bolt 1 comprising a first end portion and a second end portion at an opposite side of the bolt, wherein:
   the first end portion is provided with an enlarged diameter to form a counter-pressure surface facing the second end portion; and
   the first end portion is further provided with external threads to receive a lock nut.
2) Bolt according to item 1), wherein the enlarged diameter of the first end portion is provided by means of a nut arranged on the bolt, said nut being provided with external threads for receiving the lock nut.
3) Bolt according to item 1), wherein the first end portion is an integral part of the bolt.
4) Nut for enlarging the diameter of the bolt according to item 2), wherein said nut is provided with internal threads for contact with the bolt and with external threads for receiving a further nut.
5) Hydraulic bolt tensioning device for tensioning of a bolt according to any of items 1)-3), the hydraulic bolt tensioning device being arranged for enclosing a portion of the bolt such that it abuts the counter pressure surface.
6) Hydraulic bolt tensioning device according to item 5), wherein the hydraulic bolt tensioning device comprises a cylinder house, a piston and a piston rod.
7) Bolt tensioning assembly comprising:
   a bolt according to any one of items 1)-3);
   a hydraulic bolt tensioning device according to any one of items 5)-6); and
   a lock nut arranged on the first end portion of the bolt;
   wherein the hydraulic bolt tensioning device and the lock nut are dimensioned such that upon tightening of the lock nut, the lock nut will tighten against a portion of the hydraulic bolt tensioning device.
8) Bolt tensioning assembly according to item 7), wherein the piston rod is a portion of the bolt which is to be tensioned.
9) Method for tensioning of a bolt which is used for connecting two structural elements, the method comprising the steps of:

providing a bolt tensioning assembly according to item 5);
securely connecting the second end portion of the bolt to the structural elements;
providing hydraulic pressure to the bolt tensioning device such that the bolt is tensioned;
tightening the lock nut; and
removing the hydraulic pressure.

BRIEF DESCRIPTION OF THE DRAWINGS

In the following is described an example of a preferred embodiment illustrated in the accompanying drawings, wherein.

DETAILED DESCRIPTION OF THE DRAWINGS

In the figures, all parts will not be numbered in all the figures, in order to render the figures more clear.

Figure 1:
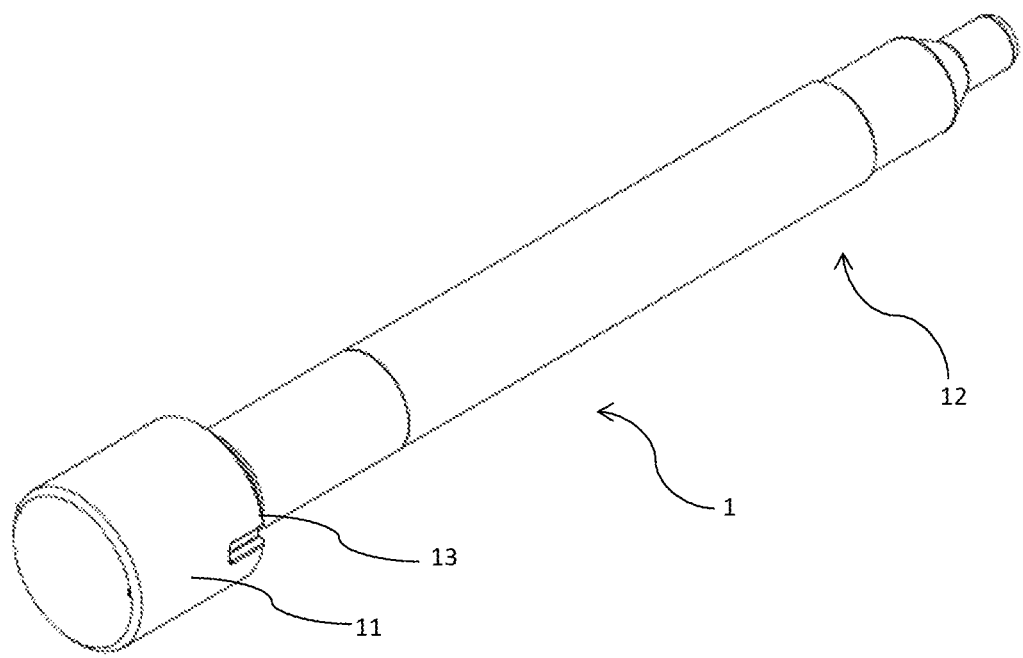
FIG. 1 shows a perspective view of a bolt as described herein.

FIG. 1 shows a bolt 1 as described herein. The bolt 1 having a first end portion 11 and an opposite second end portion 12. At the first end portion 11 the bolt 1 is shown with an enlarged diameter, such that the bolt 1 could be said to be provided with a head. It must however be noted that this area of enlarged diameter could also be between two bolt portions of a smaller diameter (not shown). A counter-pressure surface 13, or shoulder, is formed in the transition from one diameter to another. The area of the bolt 1 having an enlarged diameter is provided with external threads 14 (see FIG. 3), but which are necessary for cooperating with internal threads of a lock nut 2 (shown in FIGS. 2 and 3) which is to be arranged thereon.

Figure 2:
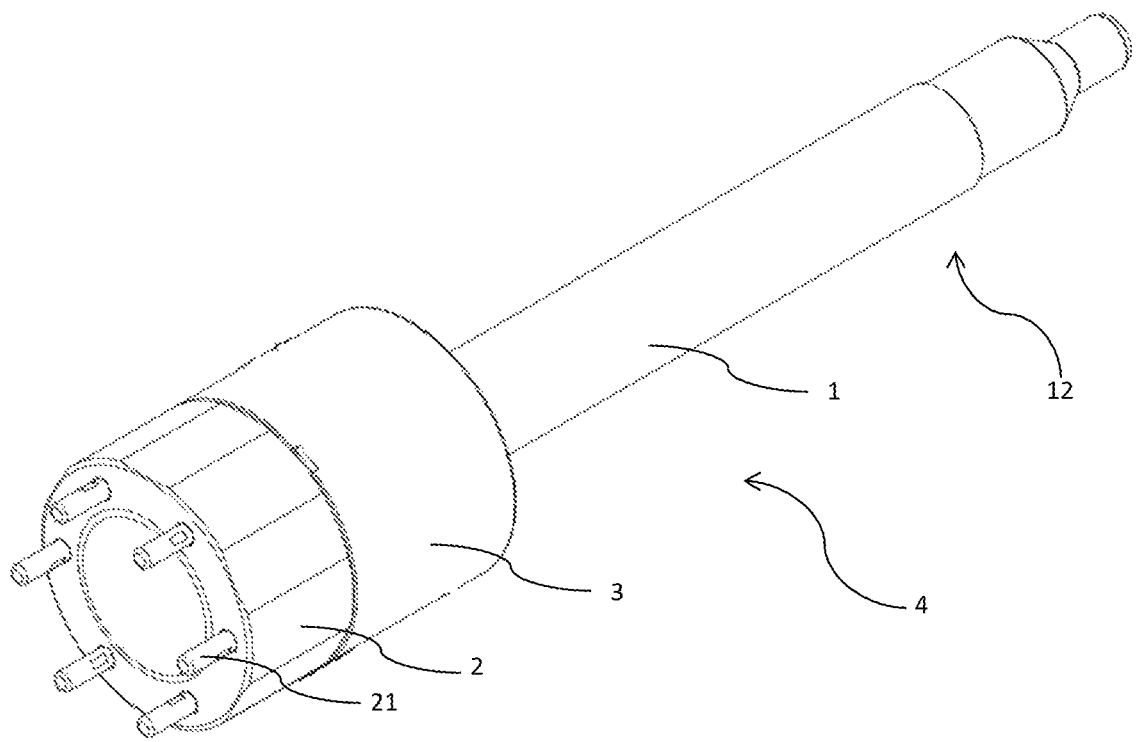
FIG. 2 shows in the same scale as FIG. 1, a perspective view of a bolt tensioning assembly according to the invention.

FIG. 2 shows a perspective view of a bolt tensioning assembly 4 comprising the bolt 1, the lock nut 2 and a bolt tensioning device 3. The second end portion 12 is here shown before installation. Said second end portion 12 is arranged for being securely connected to structural members 5 (FIGS. 4-6) of a connection within which the bolt 1 is to be used. When being installed, the second end portion 12 of the bolt 1 will be put into corresponding through-holes of the structural members 5 (FIGS. 4-6)) to be connected, such that the bolt 1 extends through the structural members 5 and exits on the other side of them, for being fastened by means of a fastening means 6 (FIGS. 4-6), for instance a nut. After insertion of the bolt 1 into the bolt hole in the structural members, the bolt tensioning device 3 will abut a contact surface (not shown) of the structural members. The lock nut 2 is in the drawing shown with a number of pins 21 for connection to a spin tool for tightening of the lock nut 2. This is not a necessary feature of the lock nut 2, as the lock nut 2 may be tightened by other means.

Figure 3:
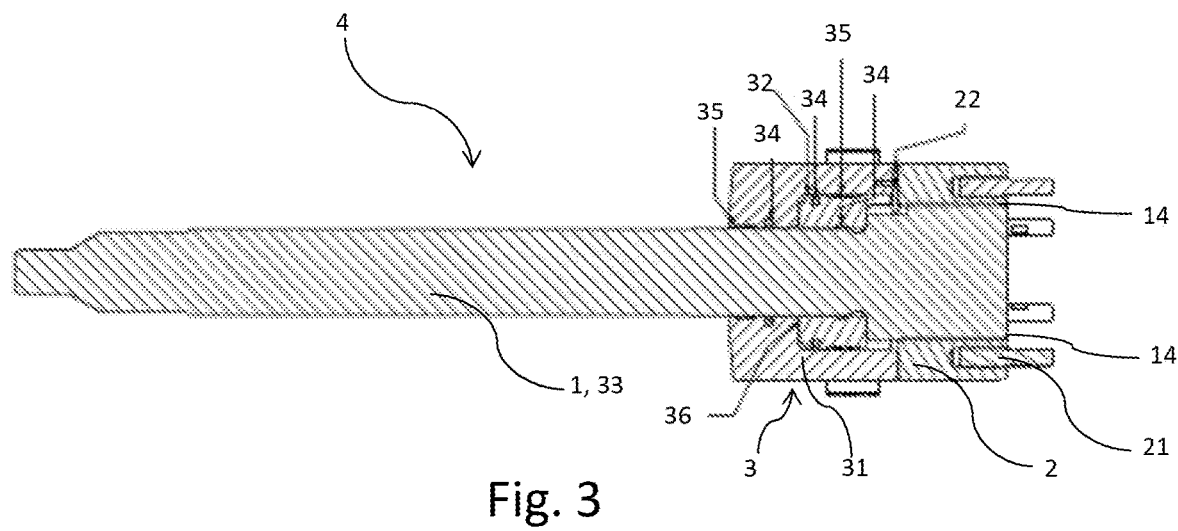
FIG. 3 shows in a different scale, a cross-section of the bolt tensioning assembly of FIG. 2.

FIG. 3 shows a cross-section of the bolt tensioning assembly 4, wherein the bolt tensioning device 3 is shown with a cylinder house 31, which could also be named a pressure body, a piston 32 and a piston rod 33. In this embodiment it is shown that the piston rod 33 may be the bolt 1. The tensioning device 3 may be assembled by first providing the bolt 1, i.e. the piston rod 33. The piston 32 may be slid over the piston rod 33, from the second end portion 12. Thereafter, the cylinder house 31 may be slid over the piston rod 33 and the piston 32. The drawing further shows the lock nut 2 and the pins 21 as mentioned above, as well as a rod lock 22 arranged between the lock nut 2 and the cylinder house 31 in order to prevent rotation of the cylinder house 31 relative to the piston rod 33, i.e. the bolt 1. Different seal rings 34 necessary for the hydraulic system are also shown, as well as and inlet 36 for hydraulic fluid. Furthermore, guide rings 35 for preventing metal-to-metal contact between the piston 32 and the cylinder house 31 or between the cylinder house 31 and the piston rod 33, are shown. These features are considered to be known to the skilled person and will not be discussed further herein.

Figure 4:
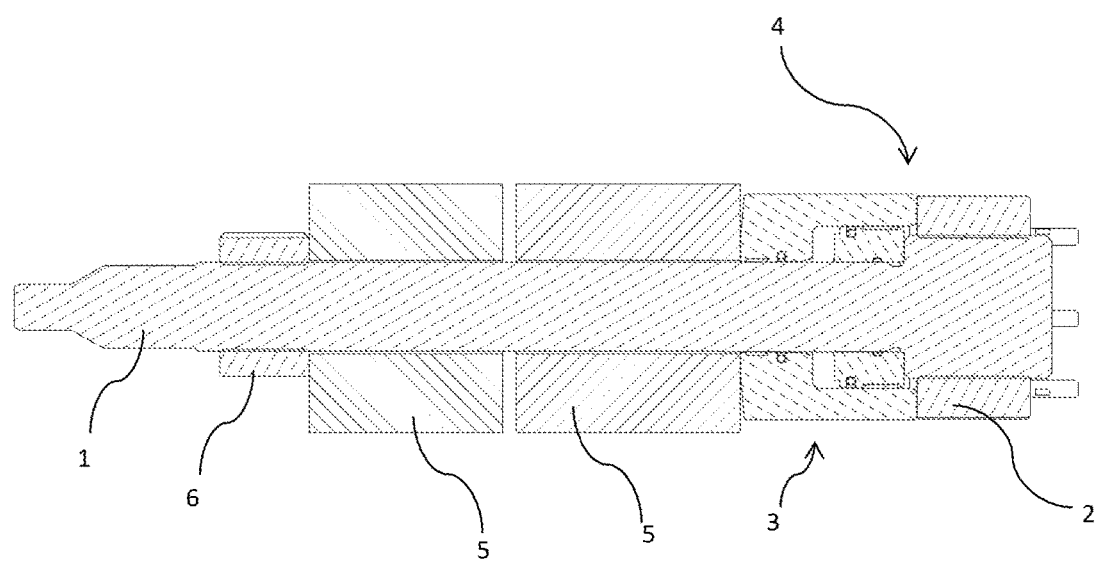
FIG. 4 shows a cross-section of a bolt tensioning assembly installed in a flange connection.

FIG. 4 shows a cross-section of the bolt tensioning assembly 4, wherein bolt 1 has been put through an opening of two structural members 5 and securely fastened by means of a nut 6. The bolt 1 has been tensioned and the lock nut 2 has been tightened such that the bolt tensioning device 3 is sandwiched between one of the structural members 5 and the lock nut 2. The hydraulic pressure has been removed and the tension is kept in the bolt 1.

Figure 5:
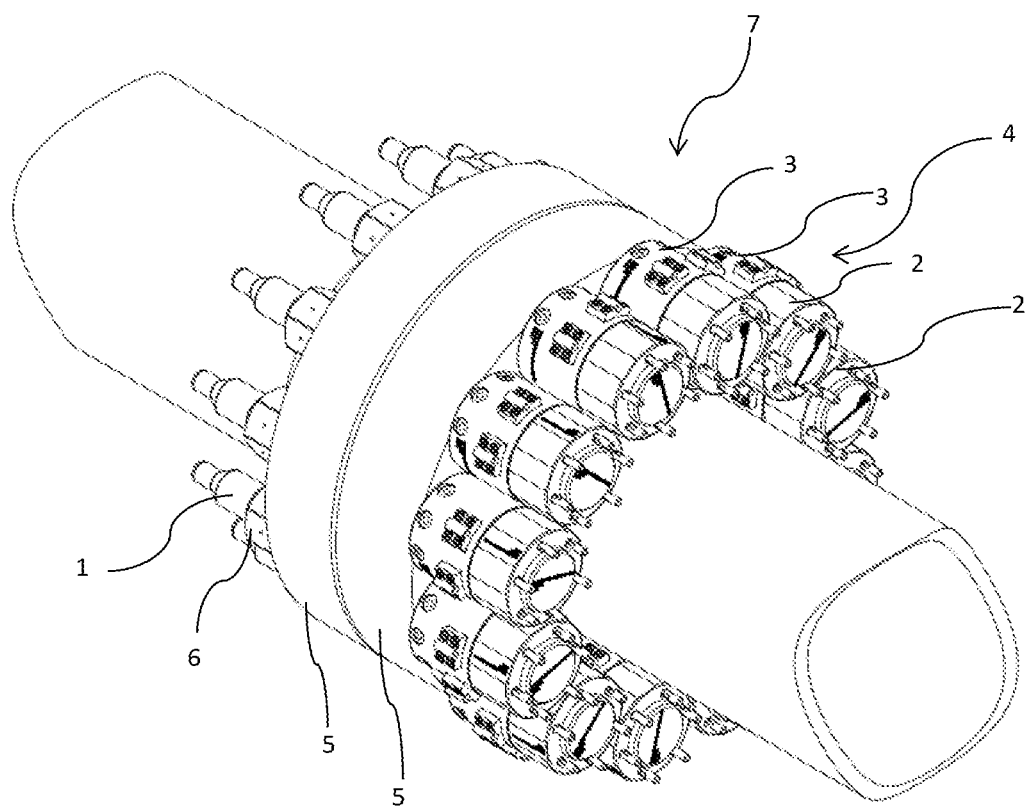
FIG. 5 shows a perspective view of multiple bolt tensioning assemblies installed in a flange connection.
Figure 6:
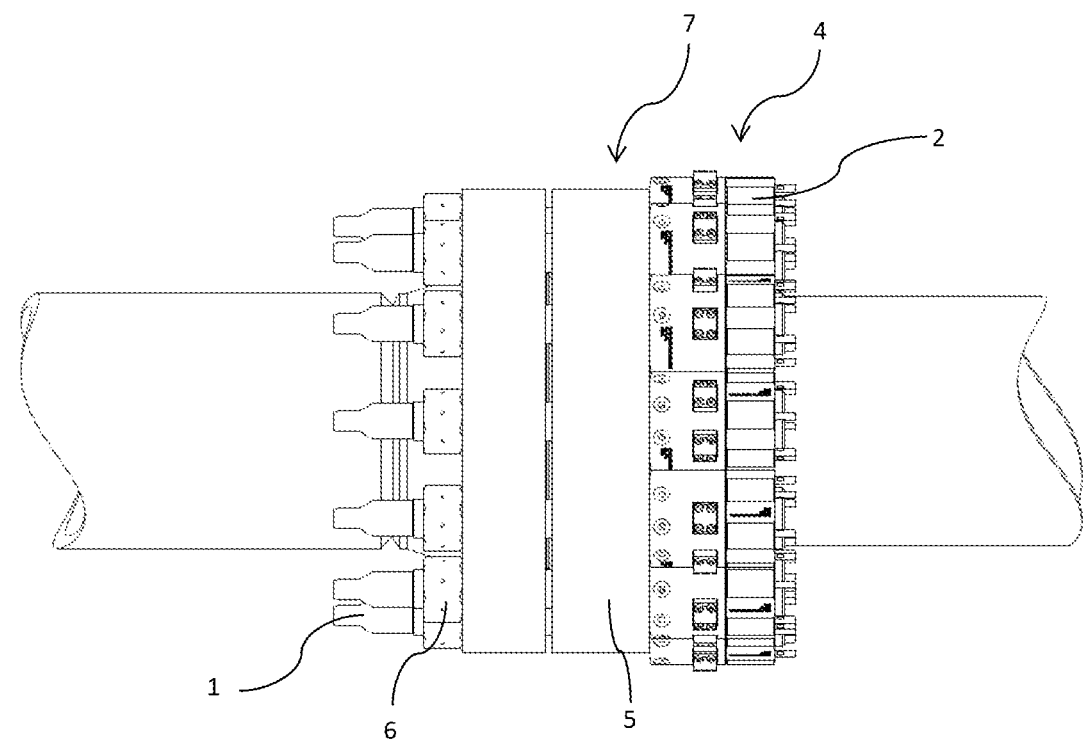
FIG. 6 is a side view of the installation of FIG. 5.

FIGS. 5 and 6 show a flange connection 7 comprising two structural members 5 which are connected to each other by means of multiple bolt tensioning assemblies 4 comprising bolts 1 bolt tensioning devices 3, and lock nuts 2.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A bolt tensioning assembly comprising:
a bolt having a head at a first end portion and a second end portion opposite to the head, wherein the head has an enlarged diameter relative to the second end portion to form a counter-pressure surface facing the second end portion, wherein the enlarged diameter of the head has external threads, and wherein the head is non-rotatable relative to the second end portion;
a hydraulic bolt tensioning device for tensioning of the bolt, the hydraulic bolt tensioning device comprising a cylinder house, a piston and a piston rod formed by a portion of the bolt, the hydraulic bolt tensioning device being arranged for enclosing the portion of the bolt, wherein the piston abuts the counter-pressure surface; and
a lock nut having internal threads for engaging with the external threads on the enlarged diameter of the head of the bolt;
wherein the hydraulic bolt tensioning device and the lock nut are dimensioned such that upon tightening of the lock nut, the lock nut will tighten against the cylinder house of the hydraulic bolt tensioning device.

2. The bolt tensioning assembly according to claim 1, wherein the second end portion has external threads for engaging with a nut.

3. A method for tensioning of a bolt which is used for connecting two structural elements, the method comprising:
   providing a bolt tensioning assembly according to claim 1;
   securely connecting the second end portion of the bolt to the structural elements;
   providing hydraulic pressure to the bolt tensioning device such that the bolt is tensioned;
   tightening the lock nut against the cylinder house of the hydraulic bolt tensioning device; and
   removing the hydraulic pressure.

4. A bolt tensioning device for tensioning a bolt having a head and a second end portion opposite to the head, wherein the head has an enlarged diameter relative to the second end portion to form a counter-pressure surface facing the second end portion, wherein the enlarged diameter of the head has external threads, and wherein the head is non-rotatable relative to the second end portion, the bolt tensioning device comprising:
   a cylinder house, a piston, and a piston rod formed by a portion of the bolt, wherein the hydraulic bolt tensioning device is arranged for enclosing the portion of the bolt, wherein the piston abuts the counter-pressure surface, and wherein the bolt tensioning device is arranged to be locked between a lock nut threadedly engaged with the external threads of the head of the bolt and a structural element to which the second end portion of the bolt has been connected.

\* \* \* \* \*